(12) United States Patent
Ren et al.

(10) Patent No.: US 11,089,599 B2
(45) Date of Patent: Aug. 10, 2021

(54) INFORMATION TRANSMISSION METHOD AND DEVICE

(71) Applicant: HUAWEI TECHNOLOGIES CO., LTD., Guangdong (CN)

(72) Inventors: Yi Ren, Shenzhen (CN); Hua Li, Shanghai (CN); Zhongfeng Li, Munich (DE); Yi Qin, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 16/400,711

(22) Filed: May 1, 2019

(65) Prior Publication Data

US 2019/0261349 A1 Aug. 22, 2019

Related U.S. Application Data

(63) Continuation of application No. PCT/CN2017/109251, filed on Nov. 3, 2017.

(30) Foreign Application Priority Data

Nov. 4, 2016 (CN) .......................... 201610976925.9

(51) Int. Cl.
*H04W 72/04* (2009.01)
*H04B 7/0452* (2017.01)
(Continued)

(52) U.S. Cl.
CPC ........ *H04W 72/048* (2013.01); *H04B 7/0452* (2013.01); *H04B 7/0617* (2013.01);
(Continued)

(58) Field of Classification Search
CPC ............. H04W 72/048; H04W 72/046; H04W 72/082; H04W 72/0413; H04W 72/042;
(Continued)

(56) References Cited

U.S. PATENT DOCUMENTS 10,326,575 B2 * 6/2019 Davydov ............... H04B 7/024
2011/0085610 A1 4/2011 Zhuang et al.
(Continued)

FOREIGN PATENT DOCUMENTS

CN 102291189 A 12/2011
CN 102332945 A 1/2012

OTHER PUBLICATIONS

International Search Report dated Feb. 2, 2018 in corresponding International Application No. PCT/CN2017/109251.
(Continued)

*Primary Examiner* — Hassan Kizou
*Assistant Examiner* — Hector Reyes
(74) *Attorney, Agent, or Firm* — Leydig, Voit & Mayer, Ltd.

(57) ABSTRACT

Embodiments of this application provide an information transmission method and a device. The method includes: sending, by a first device, M signals to a second device through N ports, where N and M are integers, and $M \geq N \geq 2$; and receiving, by the first device, measurement information sent by the second device, where the measurement information is determined by the second device based on the M signals, and the measurement information is used to indicate a relationship between the N ports. Therefore, in the embodiments of this application, the relationship between the ports is determined by using characteristics of the ports on a side of the second device, so that the first device can relatively accurately determine the relationship between the ports, and the first device can perform appropriate communication management on the plurality of ports. This improves performance of transmission between the first device and the second device.

6 Claims, 6 Drawing Sheets

(51) Int. Cl.
*H04B 7/06* (2006.01)
*H04W 72/08* (2009.01)

(52) U.S. Cl.
CPC ........ *H04B 7/0619* (2013.01); *H04W 72/046* (2013.01); *H04W 72/082* (2013.01)

(58) Field of Classification Search
CPC .. H04B 7/0619; H04B 7/0452; H04B 7/0617; H04B 7/0695; H04B 7/0413; H04B 7/0417; H04L 5/0044; H04L 5/0053
See application file for complete search history.

(56) References Cited

U.S. PATENT DOCUMENTS

| | | | |
|---|---|---|---|
| 2015/0043450 A1 | 2/2015 | Ariyavisitakul et al. | |
| 2015/0118969 A1 | 4/2015 | Chen et al. | |
| 2017/0288743 A1* | 10/2017 | Nam | H04L 5/0035 |
| 2018/0054797 A1* | 2/2018 | Islam | H04W 72/042 |
| 2018/0287681 A1* | 10/2018 | Chen | H04L 5/0057 |
| 2019/0141555 A1* | 5/2019 | Tooher | H04L 5/0057 |
| 2019/0296868 A1* | 9/2019 | Zhang | H04B 7/024 |

OTHER PUBLICATIONS

"On Qusai-Co-Location/Beam for NR MIMO," 3GPP TSG RAN WG1 Meeting #86bis, Lisbon, Portugal, R1-1608675, pp. 1-6, 3rd Generation Partnership Project, Valbonne, France (Oct. 10-14, 2016).

Ericsson, "Discussion on QCL," 3GPP TSG-RAN WG1 #86bis, Lisbon, Portugal, R1-1609766, pp. 1-6, 3rd Generation Partnership Project, Valbonne, France (Oct. 10-14, 2016).

"WF on the QCL for NR", 3GPP TSG RAN WG1 Meeting #86bis, Lisbon, Portugal, R1-1610520, 3rd Generation Partnership Project, Valbonne, France (Oct. 10-14, 2016).

Zte et al., "Beam grouping for beam management", 3GPP TSG RAN WG1 Meeting #86bis, Lisbon, Portugal, R1-1608665, 3rd Generation Partnership Project, Valbonne, France (Oct. 10-14, 2016).

* cited by examiner

INFORMATION TRANSMISSION METHOD AND DEVICE

CROSS-REFERENCE TO RELATED APPLICATIONS

This application is a continuation of International Application No. PCT/CN2017/109251, filed on Nov. 3, 2017, which claims priority to Chinese Patent Application No. 201610976925.9, filed on Nov. 4, 2016, The disclosures of the aforementioned applications are hereby incorporated by reference in their entireties.

TECHNICAL FIELD

This application relates to the communications field, and more specifically, to an information transmission method and a device.

BACKGROUND

In a fifth generation mobile communications (5th-Generation, 5G) system, low-frequency communication using only a frequency band lower than 6 GHz cannot meet a growing communication need. Therefore, high-frequency (High Frequency, HF) communication using a frequency higher than 6 GHz gains more attention from academic and industrial circles. However, energy of an HF signal is quickly attenuated in space, the HF signal has a poor penetration capability in space, and a path loss of the HF signal is far greater than that of a low frequency signal. Therefore, a gain on an antenna side needs to be used to compensate for this part of loss, to ensure coverage of an HF system. In addition, because in an HF scenario, a signal has a shorter wavelength and an antenna has a smaller size, a multiple-antenna technology of a massive antenna array (Massive-MIMO) is more suitable for the HF scenario. By using the Massive-MIMO technology, a transmit side, for example, a network device side, may form, in a digital and analog manner, a transmit beam having more concentrated energy to ensure system coverage, and a receive side, for example, a terminal device side, may also form a receive beam having more concentrated energy to increase a receive gain.

A design using a beam for communication needs to be considered in the HF communication in 5G. In addition, because both a receive party and a transmit party in the HF system tend to perform communication by using narrow beams, matching between the narrow beams is particularly important. In addition, due to a characteristic of an HF channel, a signal can hardly diffract, and instead, there is a relatively strong reflection effect. Due to low diffraction and high reflection, the HF channel presents a significant feature of being spatially-sparse and partially-related. Therefore, a transmit end needs to accurately determine a relationship between a plurality of ports (transmit ports), to perform appropriate communication management on the plurality of ports; otherwise, the transmit end can hardly perform appropriate communication management on the plurality of ports, and performance of transmission between the transmit end and a receive end is affected.

Therefore, how to accurately determine a relationship between a plurality of ports at a transmit end is a problem to be urgently resolved.

SUMMARY

Embodiments of this application provide an information transmission method and a device. In the method, a relationship between a plurality of ports can be determined relatively accurately. This improves performance of transmission between a transmit end and a receive end.

According to a first aspect, an information transmission method is provided, and the method includes:

sending, by a first device, M signals to a second device through N ports, where N and M are integers, and M≥N≥2; and receiving, by the first device, measurement information sent by the second device, where the measurement information is determined by the second device based on the M signals, and the measurement information is used to indicate a relationship between the N ports.

Specifically, the relationship between the N ports may include, for example, whether the N ports meet a quasi co-location (Quasi Co-location, QCL) relationship of a particular parameter, a correlation degree of the N ports, and/or a grouping relationship between the N ports. This embodiment of this application is not limited thereto.

It should be understood that in this embodiment of this application, the N ports may be alternatively referred to as N transmit ports. One transmit port is used to transmit at least one signal. When M=N, there is a one-to-one correspondence between the N transmit ports and the M signals, that is, each port is used to send one signal. The M signals may have a same type or different types, and this is not limited in this embodiment of this application.

Therefore, in this embodiment of this application, the relationship between the ports is described by using characteristics of the ports on a side of the second device (a receive end side), so that the first device can relatively accurately determine the relationship between the ports, and the first device can perform appropriate communication management on the plurality of ports. This improves performance of transmission between the first device and the second device.

Optionally, in an implementation, the method may further include:

performing, by the first device, communication management on the N ports based on the received measurement information.

For example, after obtaining the measurement information sent by the second device, the first device may perform, during multi-user multiple input multiple output (Multi-user Multiple Input Multiple Output, MU-MIMO) or robust transmission, appropriate communication management on the ports based on the measurement information fed back by the second device, and select an appropriate port to communicate with the second device.

Therefore, in this embodiment of this application, the first device can relatively accurately determine the relationship between the ports based on the measurement information, so that the first device can perform appropriate communication management on the plurality of ports. This improves the performance of transmission between the first device and the second device.

Specifically, in an implementation, the M signals include at least one type of the following signals:

a channel information-reference signal (Channel State Information-Reference Signal, CSI-RS), a demodulation reference signal (Demodulation Reference Signal, DMRS), a beam reference signal (Beam Reference Signal, BRS), and a phase noise reference signal (Phase Noise Reference Signal, PNRS); and the M signals are carried on at least one of the following channels:

a physical downlink control channel (Physical Downlink Control Channel, PDCCH), a physical downlink shared channel (Physical Downlink Shared Channel, PDSCH), a physical uplink control channel (Physical Uplink Control Channel, PUCCH), and a physical downlink shared channel (Physical Uplink Shared Channel, PUSCH).

In actual application, the first device may send the M signals through the N ports in a time division, frequency division, or code division manner. This embodiment of this application is not limited thereto.

With reference to the first aspect, in an implementation of the first aspect, before the sending, by a first device, M signals to a second device through N ports, the method further includes:

receiving, by the first device, capability information sent by the second device, where the capability information indicates a quantity of receive ports that can be simultaneously used by the second device to perform reception, a quantity of receive beams that can be simultaneously used by the second device to perform reception, a quantity of antenna panels of the second device, a correspondence between a transmit parameter and a receive parameter of the second device, or a reciprocity degree of the second device, the reciprocity degree includes being totally reciprocal, partially reciprocal, or totally nonreciprocal with regard to a particular parameter, and the particular parameter includes angle information and/or gain information.

The transmit parameter of the second device may be at least one of a transmit port, a transmit beam, and a transmit resource. The corresponding receive parameter may be at least one of a receive port, a receive beam, and a receive resource.

Optionally, in an implementation, the method further includes:

determining, by the first device, a value of N based on the received capability information sent by the second device.

With reference to the first aspect and the foregoing implementations of the first aspect, in another implementation of the first aspect, before the receiving, by the first device, the measurement information sent by the second device, the method further includes:

sending, by the first device, instruction information to the second device, where the instruction information is used to instruct the second device to send the measurement information to the first device.

For example, the first device may configure a reporting type of the second device by using the instruction information. The reporting type stipulates the measurement information, that is, the reporting type stipulates content of the measurement information.

It should be understood that specific content of the measurement information may be predefined in a system. When obtaining the M signals, the second device can measure the M signals based on a predefinition in the system to obtain the measurement information. Alternatively, the second device may report the measurement information as instructed by the first device.

For example, the first device may add the instruction information to downlink control information (Downlink Control Information, DCI).

Specifically, the first device may periodically send the instruction information to the second device. Duration of the period may be predefined, or may be determined by the first device based on a specific network status. This embodiment of this application is not limited thereto.

Alternatively, the first device may send the instruction information in a semi-static manner. Specifically, the first device may send the instruction information only after receiving a trigger request sent by the second device. Specifically, the trigger request is used to request to obtain the instruction information.

In this embodiment of this application, the first device sends the instruction information to indicate the content of the measurement information to be reported by the second device, so that the first device can obtain appropriate feedback information, and the first device can determine the relationship between the ports by using the characteristics of the ports on the side of the second device.

Therefore, in this embodiment of this application, the first device determines the relationship between the ports by using the characteristics of the ports on a receive side, so that the first device can relatively accurately determine the relationship between the ports, and the first device can perform appropriate communication management on the ports. This improves the performance of transmission between the first device and the second device.

With reference to the first aspect and the foregoing implementations of the first aspect, in another implementation of the first aspect, the instruction information is further used to instruct the second device to determine whether the N ports corresponding to the M signals meet a QCL relationship of a particular parameter set, and the particular parameter set includes at least one type of the following parameters:

a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, an AoD spread, and reciprocity of the second device. The reciprocity of the second device may be alternatively referred to as reciprocity between receive and transmit beams of the second device. This embodiment of this application is not limited thereto.

The measurement information includes first relationship indication information or second relationship indication information. The first relationship indication information is used to indicate that the N ports meet the QCL relationship of the particular parameter set. The second relationship indication information is used to indicate that the N ports do not meet the QCL relationship of the particular parameter set.

Therefore, in this embodiment of this application, the first device can relatively accurately determine, based on the measurement information, whether the N ports meet the QCL relationship of the particular parameter, so that the first device can perform appropriate communication management on the plurality of ports. For example, after obtaining the measurement information sent by the second device, the first device may perform, during MU-MIMO or robust transmission, appropriate communication management on the ports based on the measurement information fed back by the second device, and select an appropriate port to communicate with the second device. This improves the performance of communication between the first device and the second device.

Specifically, the second device (for example, a terminal device) may determine, based on AoAs of two reference signals, whether the two ports meet an angle of arrival quasi co-location relationship AoA-QCL. For example, when a difference between the two AoAs is less than or equal to a preset threshold, it may be determined that the two ports meet the AoA-QCL. When a difference between the two AoAs is greater than the preset threshold, it may be determined that the two ports do not meet the AoA-QCL. When the obtained measurement information is 1, the first device (for example, a network device) can determine that the two ports meet the AoA-QCL. When the obtained measurement information is 0, the first device can determine that the two ports meet the AoA-QCL.

It should be understood that when there are a plurality of ports, the first relationship indication information is used to indicate that every two ports in the plurality of ports meet the QCL relationship of the particular parameter set, and the second relationship indication information can be used to indicate that the plurality of ports include two ports that do not meet the QCL relationship of the particular parameter set, or indicate that any two ports in the plurality of ports do not meet the QCL relationship of the particular parameter set. This embodiment of this application is not limited thereto.

In this embodiment of this application, because the content of the measurement information is only one bit (0 or 1), a data amount is relatively small, and a network resource can be saved.

With reference to the first aspect and the foregoing implementations of the first aspect, in another implementation of the first aspect, the instruction information is further used to instruct the second device to determine a correlation degree of measurement results of a parameter set of every two signals in the M signals, the correlation degree of the measurement results of the parameter set of every two signals is determined based on a difference between the measurement results of the parameter set of every two signals, and the parameter set includes at least one type of the following parameters: a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, and an AoD spread; and the measurement information includes a correlation degree of the N ports that is measured by the second device, the correlation degree of the N ports is determined based on the difference between the measurement results of the parameter set of every two signals in the M signals, and the correlation degree of the N ports indicates at least one of the following: quantized differences between measurement results of parameters of each two signals in the M signals, a maximum value in the quantized differences between the measurement results of the parameters of each two signals in the M signals, a minimum value in the quantized differences between the measurement results of the parameters of each two signals in the M signals, and an average value of the quantized differences between the measurement results of the parameters of each two signals in the M signals.

Therefore, in this embodiment of this application, the first device can relatively accurately determine the correlation degree of the N ports based on the measurement information, so that the first device can perform appropriate communication management on the plurality of ports. For example, after obtaining the measurement information sent by the second device, the first device may perform, during MU-MIMO or robust transmission, appropriate communication management on the ports based on the measurement information fed back by the second device, and select an appropriate port to communicate with the second device. This improves the performance of communication between the first device and the second device.

It should be understood that in this embodiment of this application, because the "correlation degree" is determined based on the difference between the measurement results of the parameter set of every two signals in the M signals, and can reflect a degree of difference between the measurement results of the parameter set of every two signals, the term "correlation degree" may be alternatively referred to as "a degree of difference". This embodiment of this application is not limited thereto.

For example, the parameter set includes AoAs. The first device (for example, the network device) may configure the reporting type of the terminal device by using DCI, and the first device sends two signals (for example, CSI-RSs or DMRSs) through two ports. The second device (for example, the terminal device) measures a parameter set of the ports on which the two signals are located. For example, the parameter set includes AoAs. The second device determines a difference between the AoAs of the two signals to determine a correlation degree of the two ports. The correlation degree may be represented by using a quantization level, for example, correlation degree-strong and correlation degree-weak, correlation degree-strong, correlation degree-intermediate, and correlation degree-weak, or more quantization levels. This embodiment of this application is not limited thereto.

Specifically, the second device may quantize a difference between AoAs of every two signals. For example, when the difference is less than or equal to a first difference threshold, the second device quantizes the difference as 0, and it indicates the correlation degree-strong. When the difference is greater than the first difference threshold and less than a second difference threshold, the second device quantizes the difference as 1, and it indicates the correlation degree-intermediate. When the difference is greater than or equal to the second difference threshold, the second device quantizes the difference as 2, and it indicates the correlation degree-weak. The first difference threshold and the second difference threshold may be preset, or may be indicated by the first device. This embodiment of this application is not limited thereto.

The correlation degree included in the measurement information may include the quantized difference between the measurement results of the parameters of every two signals in the M signals, or may include the minimum value in the quantized difference between the measurement results of the parameters of every two signals in the M signals and the average value of the quantized difference between the measurement results of the parameters of every two signals in the M signals.

In this embodiment of this application, because the content of the measurement information includes the quantized difference, a data amount is relatively small, and a network resource can be saved.

With reference to the first aspect and the foregoing implementations of the first aspect, in another implementation of the first aspect, the measurement information includes at least one of the following:

group numbers of the N ports, a maximum group number difference in differences between each two group numbers in the group numbers of the N ports, a minimum group number difference in the differences between each two group numbers in the group numbers of the N ports, and an average value of the differences between each two group numbers in the group numbers of the N ports.

Therefore, in this embodiment of this application, the first device can relatively accurately determine the grouping relationship between the N ports based on the measurement information, so that the first device can perform appropriate communication management on the plurality of ports. For example, after obtaining the measurement information sent by the second device, the first device may perform, during MU-MIMO or robust transmission, appropriate communication management on the ports based on the measurement information fed back by the second device, and select an appropriate port to communicate with the second device. This improves the performance of communication between the first device and the second device.

For example, the first device (for example, the network device) may configure the reporting type of the second device (for example, the terminal device) by using DCI, and the first device sends two signals (for example, CSI-RSs or DMRSs) through two ports. The second device measures group numbers of the two signals. The second device determines the measurement information based on the group numbers of the N ports. For example, the measurement information includes at least one of the following: the group numbers of the N ports, the maximum group number difference in the difference between every two group numbers in the group numbers of the N ports, the minimum group number difference in the difference between every two group numbers in the group numbers of the N ports, and the average value of the difference between every two group numbers in the group numbers of the N ports.

The group numbers of the N ports may be determined by using receive information of the side of the second device.

With reference to the first aspect and the foregoing implementations of the first aspect, in another implementation of the first aspect, the receiving, by the first device, measurement information sent by the second device includes:

receiving, by the first device on a reserved resource, the measurement information sent by the second device.

For example, the first device receives, on a system-predefined resource or the reserved resource, the measurement information sent by the second device. For example, the first device may receive the measurement information that is sent by the second device by using existing signaling (for example, an ACK/NACK). The measurement information may be carried in a reserved bit in an existing frame structure. This embodiment of this application is not limited thereto.

Therefore, in this embodiment of this application, the relationship between the ports is described by using the characteristics of the ports on the side of the second device (the receive side), so that the first device can relatively accurately determine the relationship between the ports, and can perform appropriate communication management on the plurality of ports. This improves system performance.

According to a second aspect, an information transmission method is provided, and the method includes:

receiving, by a second device, M signals that are sent by the first device through N ports, where N and M are integers, and M≥ N≥2;

measuring, by the second device, the M signals to obtain measurement information, where the measurement information is used to indicate a relationship between the N ports; and sending, by the second device, the measurement information to the first device.

Therefore, in this embodiment of this application, the second device sends the measurement information to the first device, so that the first device can describe the relationship between the ports by using characteristics on a side of the second device (a receive side), can relatively accurately determine the relationship between the ports, and can perform appropriate communication management on the plurality of ports. This improves system performance.

It should be understood that the second aspect corresponds to the first aspect, an execution body in the first aspect is the first device, and an execution body in the second aspect may be the second device. For corresponding features of the method on the side of the second device, refer to the corresponding descriptions on a side of the first device in the first aspect. Therefore, for brevity, detailed descriptions are appropriately omitted.

With reference to the second aspect, in an implementation of the second aspect, before the measuring, by the second device, the M signals to obtain measurement information, the method further includes:

receiving, by the second device, instruction information sent by the first device, where the instruction information is used to indicate a reporting type, and the reporting type stipulates the measurement information.

Specifically, the second device first sends a trigger request to the first device. After obtaining the trigger request, the first device sends the instruction information to the second device. Then, the second device measures the M signals based on the instruction information to obtain the measurement information.

In this embodiment of this application, the first device sends the instruction information to indicate content of the measurement information to be reported by the second device, so that the first device can obtain appropriate feedback information, and describe the relationship between the ports by using the characteristics of the ports on the receive side.

Therefore, in this embodiment of this application, the second device sends the measurement information to the first device, so that the first device can relatively accurately determine the relationship between the ports by using the characteristics on the side of the second device (the receive side), and can perform appropriate communication management on the plurality of ports. This improves the system performance.

With reference to the second aspect and the foregoing implementation of the second aspect, in another implementation of the second aspect, the M signals include at least one type of the following signals:

a channel information-reference signal CSI-RS, a demodulation reference signal DMRS, a beam reference signal BRS, and a phase noise reference signal PNRS; and the M signals are carried on at least one of the following channels:

a physical downlink control channel PDCCH, a physical downlink shared channel PDSCH, a physical uplink control channel PUCCH, and a physical downlink shared channel PUSCH.

With reference to the second aspect and the foregoing implementations of the second aspect, in another implementation of the second aspect, the sending, by the second device, the measurement information to the first device includes:

sending, by the second device, the measurement information to the first device on a reserved resource.

With reference to the second aspect and the foregoing implementations of the second aspect, in another implementation of the second aspect, the instruction information is further used to instruct the second device to determine whether the N ports corresponding to the M signals meet a QCL relationship of a particular parameter set; and the measuring, by the second device, the M signals to obtain measurement information includes:

determining, by the second device based on the reporting type, whether the N ports corresponding to the M signals meet the QCL relationship of the particular parameter set, where the particular parameter set includes at least one type of the following parameters: a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, an AoD spread, and reciprocity of the second device; and determining, by the second device, the measurement information based on a result of the determining whether the N ports meet the QCL relationship of the particular parameter set, where the measurement information includes first relationship indication information or second relationship indication information, the first relationship indication information is used to indicate that the N ports meet the QCL relationship of the particular parameter set, and the second relationship indication information is used to indicate that the N ports do not meet the QCL relationship of the particular parameter set.

With reference to the second aspect and the foregoing implementations of the second aspect, in another implementation of the second aspect, the instruction information is further used to instruct the second device to determine a correlation degree of measurement results of a parameter set of every two signals in the M signals, and the correlation degree of the measurement results of the parameter set of every two signals is determined based on a difference between the measurement results of the parameter set of every two signals; and the measuring, by the second device, the M signals to obtain measurement information includes:

determining, by the second device, a difference between measurement results of parameters of every two signals in the M signals based on the reporting type, where the parameter includes: a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, and an AoD spread; and determining, by the second device, the measurement information based on a difference between the parameters of every two signals in the M signals, where the measurement information includes a correlation degree of the N ports that is measured by the second device, and the correlation degree of the N ports indicates at least one of the following: a quantized difference between the measurement results of the parameters of every two signals in the M signals, a maximum value in the quantized differences between the measurement results of the parameters of each two signals in the M signals, a minimum value in the quantized differences between the measurement results of the parameters of each two signals in the M signals, and an average value of the quantized differences between the measurement results of the parameters of each two signals in the M signals.

With reference to the second aspect and the foregoing implementations of the second aspect, in another implementation of the second aspect, the measuring, by the second device, the M signals to obtain measurement information includes:

determining, by the second device, group numbers of the N ports based on receive information of the side of the second device; and determining, by the second device, the measurement information based on the group numbers of the N ports, where the measurement information includes at least one of the following: the group numbers of the N ports, a maximum group number difference in differences between each two group numbers in the group numbers of the N ports, a minimum group number difference in the differences between each two group numbers in the group numbers of the N ports, and an average value of the differences between each two group numbers in the group numbers of the N ports.

With reference to the second aspect and the foregoing implementations of the second aspect, in another implementation of the second aspect, before the receiving, by a second device, M signals that are sent by the first device through N ports, the method further includes:

sending, by the second device, capability information to the first device, where the capability information indicates a quantity of receive ports that can be simultaneously used by the second device to perform reception, a quantity of receive beams that can be simultaneously used by the second device to perform reception, a quantity of antenna panels of the second device, a correspondence between a transmit parameter and a receive parameter of the second device, or a reciprocity degree of the second device, the reciprocity degree includes being totally reciprocal, partially reciprocal, or totally nonreciprocal with regard to a particular parameter, and the particular parameter includes angle information and/or gain information.

Therefore, in this embodiment of this application, the second device sends the measurement information to the first device, so that the first device can relatively accurately determine the relationship between the ports by using the characteristics on the side of the second device (the receive side), and can perform appropriate communication management on the plurality of ports. This improves the system performance.

According to a third aspect, a first device is provided, configured to perform the method in the first aspect or any possible implementation of the first aspect. Specifically, the first device includes units configured to perform the method.

According to a fourth aspect, a second device is provided, configured to perform the method in the second aspect or any possible implementation of the second aspect. Specifically, the second device includes units configured to perform the method.

According to a fifth aspect, a first device is provided. The first device includes a processor and a memory, the memory is configured to store a computer program, and the processor is configured to execute the computer program stored in the memory, to perform the method in the first aspect or any possible implementation of the first aspect.

According to a sixth aspect, a second device is provided. The second device includes a processor and a memory, the memory is configured to store a computer program, and the processor is configured to execute the computer program stored in the memory, to perform the method in the second aspect or any possible implementation of the second aspect.

According to a seventh aspect, a computer readable medium is provided, configured to store a computer program. The computer program includes an instruction used to perform the method in the first aspect or any possible implementation of the first aspect.

According to an eighth aspect, a computer readable medium is provided, configured to store a computer program. The computer program includes an instruction used to perform the method in the second aspect or any possible implementation of the second aspect.

DESCRIPTION OF EMBODIMENTS

The following clearly and completely describes the technical solutions in the embodiments of this application with reference to the accompanying drawings in the embodiments of this application.

It should be understood that the embodiments of this application may be applied to various communications systems. Therefore, the following descriptions are not limited to a particular communications system. For example, the embodiments of this application may be applied to a Global System for Mobile Communications (Global System for Mobile Communications, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunications System, UMTS), and the like.

In the embodiments of this application, a terminal device may be alternatively referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, and a terminal device in a future 5G network.

In the embodiments of this application, a network device may be a device, for example, a network side device, configured to communicate with a mobile device. The network-side device may be a base transceiver station (Base Transceiver Station, BTS) in the Global System for Mobile Communications (Global System of Mobile communication, GSM) or Code Division Multiple Access (Code Division Multiple Access, CDMA), a NodeB (NodeB, NB) in Wideband Code Division Multiple Access (Wideband Code Division Multiple Access, WCDMA), an evolved NodeB (Evolutional NodeB, eNB or eNodeB) in Long Term Evolution (Long Term Evolution, LTE), a relay station or an access point, an in-vehicle device, a wearable device, or a network-side device in the future 5G network.

Figure 1:
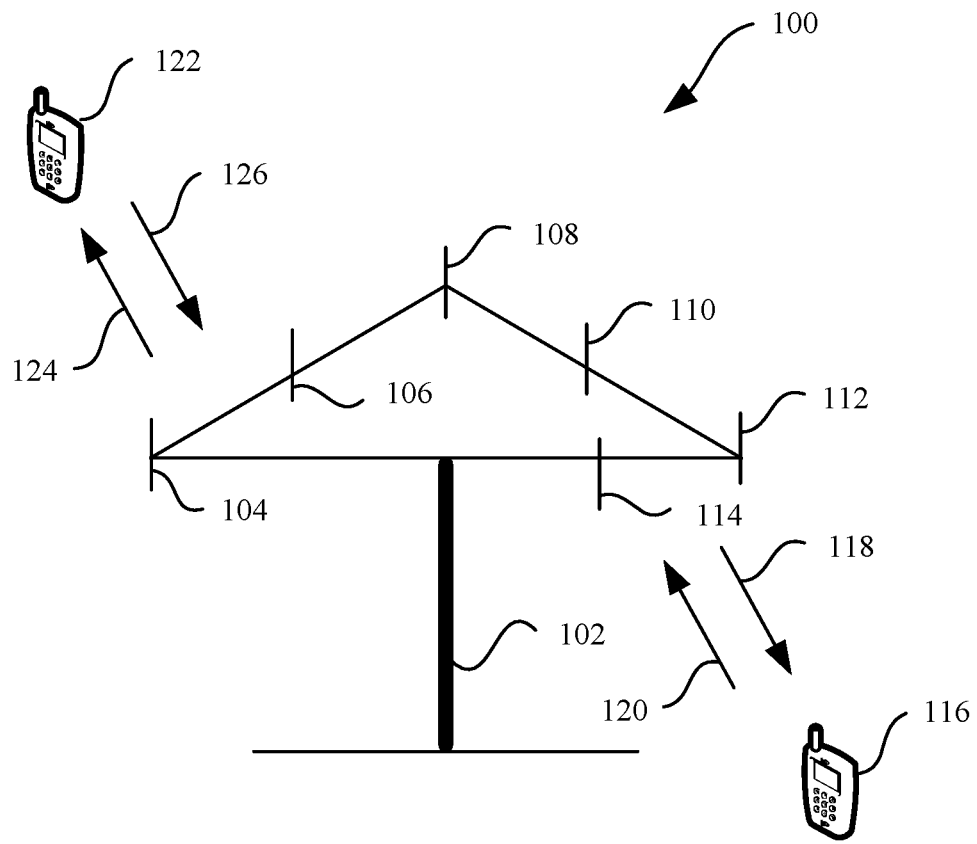
FIG. 1 is a schematic diagram of a wireless communications system according to an embodiment of this application.

FIG. 1 is a schematic diagram of a communications system of a data transmission method according to this application. The communications system may be any one of the foregoing communications systems. As shown in FIG. 1, the communications system 100 includes a network side device 102, and the network side device 102 may include a plurality of antenna groups. Each antenna group may include a plurality of antennas. For example, one antenna group may include antennas 104 and 106, another antenna group may include antennas 108 and 110, and an additional group may include antennas 112 and 114. FIG. 1 shows two antennas for each antenna group, but each group may include more or fewer antennas. The network side device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The network side device 102 may communicate with a plurality of terminal devices (for example, a terminal device 116 and a terminal device 122). However, it may be understood that the network side device 102 may communicate with any quantity of terminal devices similar to the terminal device 116 or 122. Each of the terminal devices 116 and 122 may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (Frequency Division Duplex, FDD) system, the forward link 118 and the reverse link 120 may use different frequency bands, and the forward link 124 and the reverse link 126 may use different frequency bands.

For another example, in a time division duplex (Time Division Duplex, TDD) system and a full duplex (Full Duplex) system, the forward link 118 and the reverse link 120 may use a same frequency band, and the forward link 124 and the reverse link 126 may use a same frequency band.

Each antenna group and/or region designed for communication is referred to as a sector of the network side device 102. For example, an antenna group may be designed to communicate with a terminal device in a sector in a coverage area of the network side device 102. In a process in which the network side device 102 communicates with the terminal devices 116 and 122 respectively through the forward links 118 and 124, beamforming may be used in transmit antennas of the network side device 102, to increase signal to noise ratios of the forward links 118 and 124. In addition, compared with a manner in which a network side device sends signals to all terminal devices of the network side device by using a single antenna, when the network side device 102 sends, through beamforming, signals to the terminal devices 116 and 122 randomly distributed in a related coverage area, a mobile device in a neighboring cell receives relatively low interference.

At a given time, the network side device 102, the terminal device 116, or the terminal device 122 may be a wireless communication sending apparatus and/or a wireless communication receiving apparatus. When sending data, the wireless communication sending apparatus may encode the data for transmission. Specifically, the wireless communication sending apparatus may obtain (for example, perform generation, perform reception from another communications apparatus, or perform storage in a memory) a particular quantity of data bits that need to be sent to the wireless communication receiving apparatus through a channel. The data bit may be included in a transport block (or a plurality of transport blocks) of data, and the transport block may be segmented to generate a plurality of code blocks.

It should be noted that in the prior art, a transmit side usually describes a relationship between a plurality of ports on the transmit side by using information about the transmit side. For example, a quasi co-location (Quasi Co-location, QCL) relationship between ports is defined in LTE-A to indicate that a large-scale parameter of a port may be described by using another port. To be specific, in a QCL solution described in the LTE-A, a parameter used to determine whether two ports (port) meet QCL includes an average gain (average gain), an average delay (average delay), a delay spread (delay spread), and a Doppler spread (Doppler spread). However, these parameters are estimated by a transmit end, and there is no description about a beam angle in space.

Figure 2:
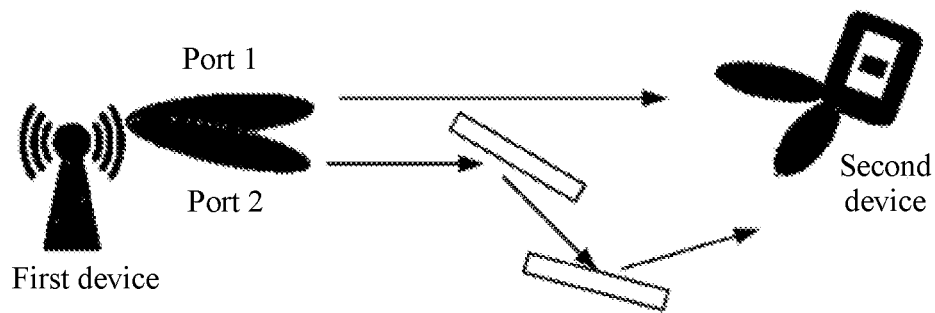
FIG. 2 is a schematic diagram of information transmission.

Because in an HF, a channel is more complex, and some characteristics of a transmit beam on a receive side, for example, an angle of arrival (Angle of Arrival, AoA) of the beam, gain more attention in scenarios of multi-user multiple input multiple output (Multi-user Multiple Input Multiple Output, MU-MIMO), robust transmission design, and the like, beam (beamforming) information of a user side needs to be considered in a QCL relationship in a 5G scenario. Due to existence of a reflection path, beams emitted from two neighboring ports of the transmit end may have highly different AoAs on the receive side, as shown in FIG. 2. A beam 1 and a beam 2 respectively emitted by a port 1 and a port 2 are two neighboring beams. Due to existence of a reflection path, receive AoAs of the transmit port 1 and the transmit port 2 differ greatly. As a result, it is inaccurate to describe the relationship between the plurality of ports on the transmit side only by using the information about the transmit side, and the transmit end cannot perform appropriate communication management on the plurality of ports, leading to deterioration in performance of transmission between the transmit end and a receive end.

Based on this problem, the embodiments of this application propose that a relationship between ports is determined by using characteristics of the ports on a receive end. To be specific, a second device (which may be alternatively referred to as the receive end) feeds back, to a first device (which may be alternatively referred to as a transmit end), measurement information used to indicate a relationship between ports, so that the first device can relatively accurately determine the relationship between the ports based on the measurement information. Therefore, the first device can perform appropriate communication management on the ports, and select an appropriate port to communicate with the second device. This can improve performance of transmission between the first device and the second device.

For example, the relationship between the ports may include whether the N ports meet a QCL relationship of a particular parameter, a correlation degree of the N ports, and/or grouping information of the N ports.

After obtaining the measurement information sent by the second device, the first device performs communication management on the N ports based on the received measurement information.

For example, the first device may perform, during MU-MIMO or robust transmission, appropriate communication management on the ports based on the measurement information fed back by the second device, and select an appropriate port to communicate with the second device. This can improve the performance of transmission between the first device and the second device.

For ease of understanding and description, by way of example rather than limitation, an execution process and execution actions of an information transmission method in the communications system in this application are described below.

It should be understood that in the embodiments of this application, the term "port" may be a logical antenna port. When the first device sends a signal to the second device through a port, the port may be referred to as a transmit port, and the transmit port may be alternatively referred to as a transmit antenna port or a transmit resource. One transmit beam has one identifier or index, and different transmit beams have different identifiers or indexes. There is a correspondence between a transmit port and a transmit beam. For example, a number of a transmit beam may be determined jointly by using a port and a transmit resource. For example, on a time resource block 1, a BS transmits a signal through transmit ports 0 and 1, and in this case, the transmit ports correspond to transmit beams 0 and 1. On a next time resource block, that is, a time resource block 2, the BS transmits a signal through the transmit ports 0 and 1, and in this case, the transmit ports correspond to transmit beams 2 and 3.

Similarly, in the embodiments of this application, a receive port may be a logical antenna port, and the receive port may be alternatively referred to as a receive antenna port or a receive resource. One receive beam has one identifier or index, and different receive beams have different identifiers or indexes.

Figure 3:
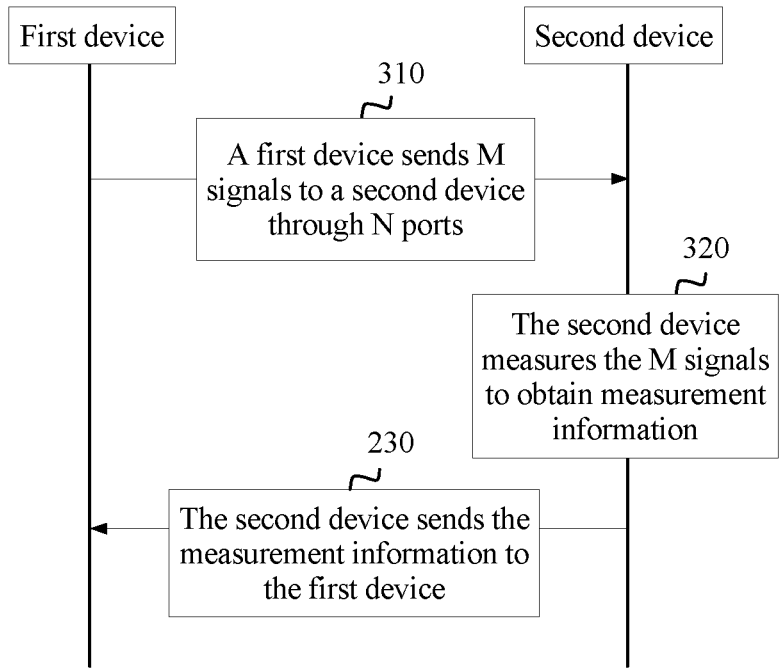
FIG. 3 is a schematic flowchart of an information transmission method according to an embodiment of this application.

FIG. 3 is a schematic flowchart of an information transmission method according to an embodiment of this application. The method shown in FIG. 3 may be applied to the foregoing various communications systems. A communications system in this embodiment of this application includes a first device and a plurality of second devices. It should be understood that in this embodiment of this application, the first device may be a network device, and the second device may be a terminal device, or the first device and the second device both may be network devices, or the first device and the second device both may be terminal devices. The following provides a detailed description by using an example in which the first device is a network device and the second device is a terminal device. Specifically, a method 300 shown in FIG. 3 includes the following steps.

310. The first device sends M signals to the second device through N ports, where N and M are integers, and M≥N≥2.

It should be understood that in this embodiment of this application, the N ports may be alternatively referred to as N transmit ports. One transmit port is used to transmit at least one signal. When M=N, there is a one-to-one correspondence between the N transmit ports and the M signals, that is, each port is used to send one signal. The M signals may have a same type or different types, and this is not limited in this embodiment of this application.

Specifically, in another embodiment, the M signals include at least one type of the following signals:

a channel information-reference signal (Channel State Information-Reference Signal, CSI-RS), a demodulation reference signal (Demodulation Reference Signal, DMRS), a beam reference signal (Beam Reference Signal, BRS), and a phase noise reference signal (Phase Noise Reference Signal, PNRS).

The M signals may be carried on at least one of the following channels:

a physical downlink control channel (Physical Downlink Control Channel, PDCCH), a physical downlink shared channel (Physical Downlink Shared Channel, PDSCH), a physical uplink control channel (Physical Uplink Control Channel, PUCCH), and a physical downlink shared channel (Physical Uplink Shared Channel, PUSCH).

In actual application, the first device may send the M signals through the N ports in a time division, frequency division, or code division manner. This embodiment of this application is not limited thereto.

Therefore, in this embodiment of this application, the first device sends the signals to the second device, so that the second device detects the signals to obtain measurement information.

It should be understood that a value of N may be determined based on an actual application scenario. This is not limited in this embodiment of this application.

Optionally, the value of N may be determined by using capability information of the second device. Correspondingly, in another embodiment, before step 310, the method 300 may further include:

receiving, by the first device, capability information sent by the second device, where the capability information indicates a quantity of receive ports that can be simultaneously used by the second device to perform reception, a quantity of receive beams that can be simultaneously used by the second device to perform reception, a quantity of antenna panels of the second device, a correspondence between a transmit parameter and a receive parameter of the second device, or a reciprocity degree of the second device, the reciprocity degree includes being totally reciprocal, partially reciprocal, or totally nonreciprocal with regard to a particular parameter, and the particular parameter includes angle information and/or gain information.

The transmit parameter of the second device may be at least one of a transmit port, a transmit beam, and a transmit resource. The corresponding receive parameter may be at least one of a receive port, a receive beam, and a receive resource.

The value of the quantity N of the ports may be determined by the first device based on the capability information. However, this embodiment of this application is not limited thereto.

It should be understood that in this embodiment of this application, the reciprocity degree of the second device refers to a capability of the second device for using a parameter of a received signal as a parameter of a sent signal. Being totally reciprocal means that the second device may use parameters of all received signals as parameters of sent signals, for example, directly use an angle of arrival AoA of a downlink signal as an uplink angle of departure AoD of an uplink signal. Being partially reciprocal means that the second device can use parameters of some received signals as parameters of sent signals. Being totally nonreciprocal means that the second device cannot use a parameter of a received signal as a parameter of a sent signal. It should be noted that for a definition of the reciprocity degree in this embodiment of this application, refer to a limitation in an existing standard. This embodiment of this application is not limited thereto.

320. The second device measures the M signals to obtain measurement information, where the measurement information is used to indicate a relationship between the N ports.

Specifically, specific content of the measurement information may be predefined in a system. When obtaining the M signals, the second device can measure the M signals based on a predefinition in the system to obtain the measurement information.

Alternatively, in another embodiment, before step 320, the method may further include:

sending, by the first device, instruction information to the second device, where the instruction information is used to instruct the second device to send the measurement information to the first device.

For example, the first device may configure a reporting type of the second device by using the instruction information. The reporting type stipulates the measurement information, that is, the measurement information stipulates the content of the measurement information.

For example, the first device may add the instruction information to downlink control information (Downlink Control Information, DCI).

Specifically, the first device may periodically send the instruction information to the second device. Duration of the period may be predefined, or may be determined by the first device based on a specific network status. This embodiment of this application is not limited thereto.

Alternatively, the first device may send the instruction information in a semi-static manner. Specifically, the first device may send the instruction information only after receiving a trigger request sent by the second device. Specifically, the trigger request is used to request to obtain the instruction information.

In other words, before step 320, the second device first sends the trigger request to the first device. After obtaining the trigger request, the first device sends the instruction information to the second device. Then, the second device measures the M signals based on the instruction information to obtain the measurement information.

In this embodiment of this application, the first device sends the instruction information to indicate the content of the measurement information to be reported by the second device, so that the first device can obtain appropriate feedback information, and the first device can determine the relationship between the ports by using characteristics of the ports on a side of the second device.

Therefore, in this embodiment of this application, the first device determines the relationship between the ports by using characteristics of the ports on a receive side, so that the first device can relatively accurately determine the relationship between the ports, and the first device can perform appropriate communication management on the ports. This improves performance of transmission between the first device and the second device.

It should be understood that the reporting type indicated in the instruction information in this embodiment of this application may be alternatively referred to as a reporting mode. Specific content of the reporting mode may be predefined. In this embodiment of this application, there may be a plurality of reporting modes, and specific content of each reporting mode is predefined. The first device may indicate one reporting mode by using the instruction information.

It should be noted that in this embodiment of this application, the measurement information that is reported by the second device and that is indicated in the instruction information sent by the first device may have a plurality of forms. The following provides detailed descriptions for different cases. The instruction information further instructs the second device to perform determining processing on the M signals. For example, the instruction information stipulates, by using the indicated reporting type, that the second device performs determining processing on the M signals, or the instruction information itself directly instructs the second device to perform determining processing on the M signals. This embodiment of this application is not limited thereto. The measurement information is determined by the second device based on a determining result of the determining processing performed on the M signals. For details, refer to case 1 and case 2 in the following. Optionally, the instruction information may not need to stipulate the determining processing, but directly stipulates the measurement information. For details, refer to case 3 in the following.

Case 1: The measurement information is used to indicate the relationship between the N ports, and the relationship between the ports may include, for example, whether the N ports meet a QCL relationship of a particular parameter.

Specifically, the instruction information is further used to instruct the second device to determine whether the N ports corresponding to the M signals meet a QCL relationship of a particular parameter set. The particular parameter set includes at least one type of the following parameters:

a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, an AoD spread, and reciprocity of the second device. The reciprocity of the second device may be alternatively referred to as reciprocity between receive and transmit beams of the second device. This embodiment of this application is not limited thereto.

The measurement information includes first relationship indication information or second relationship indication information. The first relationship indication information is used to indicate that the N ports meet the QCL relationship of the particular parameter set. The second relationship indication information is used to indicate that the N ports do not meet the QCL relationship of the particular parameter set.

Therefore, in this embodiment of this application, the first device can relatively accurately determine, based on the measurement information, whether the N ports meet the QCL relationship of the particular parameter, so that the first device can perform appropriate communication management on the plurality of ports. For example, after obtaining the measurement information sent by the second device, the first device may perform, during MU-MIMO or robust transmission, appropriate communication management on the ports based on the measurement information fed back by the second device, and select an appropriate port to communicate with the second device. This improves the performance of communication between the first device and the second device.

It should be understood that the reciprocity of the second device may be defined as that the second device uses a direction of a receive port used to receive a downlink signal as a direction of an uplink port.

For the case 1, in step 320, the second device determines, based on the reporting type, whether the N ports corresponding to the M signals meet the QCL relationship of the particular parameter set.

The second device determines the measurement information based on a result of the determining whether the N ports meet the QCL relationship of the particular parameter set.

For example, the particular parameter set includes AoAs. The network device may configure the reporting type of the terminal device by using DCI, and the network device sends two signals (for example, CSI-RSs or DMRSs) through two ports. The terminal device measures a particular parameter set of the ports on which the two signals are located. For example, the particular parameter set includes AoAs. The terminal device determines whether the two ports meet an AoA-QCL condition. If the two ports meet the AoA-QCL condition, the terminal device feeds back the first relationship indication information, for example, 1. If the two ports do not meet the AoA-QCL condition, the terminal device feeds back the second relationship indication information, for example, 0.

Specifically, the second device (for example, the terminal device) may determine, based on the AoAs of two reference signals, whether the two ports meet an angle of arrival quasi co-location relationship AoA-QCL. For example, when a difference between the two AoAs is less than or equal to a preset threshold, it may be determined that the two ports meet the AoA-QCL. When the difference between the two AoAs is greater than the preset threshold, it may be determined that the two ports do not meet the AoA-QCL. When the obtained measurement information is 1, the first device (for example, the network device) can determine that the two ports meet the AoA-QCL. When the obtained measurement information is 0, the first device can determine that the two ports meet the AoA-QCL.

It should be understood that when there are a plurality of ports, the first relationship indication information is used to indicate that every two ports in the plurality of ports meet the QCL relationship of the particular parameter set, and the second relationship indication information can be used to indicate that the plurality of ports include two ports that do not meet the QCL relationship of the particular parameter set, or indicate that any two ports in the plurality of ports do not meet the QCL relationship of the particular parameter set. This embodiment of this application is not limited thereto.

In this embodiment of this application, because the content of the measurement information is only one bit (0 or 1), a data amount is relatively small, and a network resource can be saved.

Case 2: The measurement information is used to indicate the relationship between the N ports, and the relationship between the ports may include, for example, a correlation degree of the N ports.

Specifically, the instruction information is further used to instruct the second device to determine a correlation degree of measurement results of a parameter set of every two signals in the M signals. The correlation degree of the measurement results of the parameter set of every two signals is determined based on a difference between the measurement results of the parameter set of every two signals.

The parameter set includes at least one type of the following parameters:

a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, and an AoD spread.

The measurement information includes a correlation degree of the N ports that is measured by the second device. The correlation degree of the N ports is determined based on the difference between the measurement results of the parameter set of every two signals in the M signals. The correlation degree of the N ports indicates at least one of the following: quantized differences between measurement results of parameters of each two signals in the M signals, a maximum value in the quantized differences between the measurement results of the parameters of each two signals in the M signals, a minimum value in the quantized differences between the measurement results of the parameters of each two signals in the M signals, and an average value of the quantized differences between the measurement results of the parameters of each two signals in the M signals.

Therefore, in this embodiment of this application, the first device can relatively accurately determine the correlation degree of the N ports based on the measurement information, so that the first device can perform appropriate communication management on the plurality of ports. For example, after obtaining the measurement information sent by the second device, the first device may perform, during MU-MIMO or robust transmission, appropriate communication management on the ports based on the measurement information fed back by the second device, and select an appropriate port to communicate with the second device. This improves the performance of communication between the first device and the second device.

It should be understood that in this embodiment of this application, because the "correlation degree" is determined based on the difference between the measurement results of the parameter set of every two signals in the M signals, and can reflect a degree of difference between the measurement results of the parameter set of every two signals, the term "correlation degree" may be alternatively referred to as "a degree of difference". This embodiment of this application is not limited thereto.

For the case 2, in step 320, the second device determines a difference between the measurement results of the parameters of every two signals in the M signals based on the reporting type.

The second device determines the measurement information based on a difference between the parameters of every two signals in the M signals. The measurement information includes the correlation degree of the N ports that is measured by the second device. The correlation degree of the N ports indicates at least one of the following: the quantized difference between the measurement results of the parameters of every two signals in the M signals, the maximum value in the quantized difference between the measurement results of the parameters of every two signals in the M signals, the minimum value in the quantized difference between the measurement results of the parameters of every two signals in the M signals, and the average value of the quantized difference between the measurement results of the parameters of every two signals in the M signals.

For example, the parameter set includes AoAs. The first device (for example, the network device) may configure the reporting type of the terminal device by using DCI, and the first device sends two signals (for example, CSI-RSs or DMRSs) through two ports. The second device (for example, the terminal device) measures a parameter set of the ports on which the two signals are located. For example, the parameter set includes AoAs. The second device determines a difference between the AoAs of the two signals to determine a correlation degree of the two ports. The correlation degree may be represented by using a quantization level, for example, correlation degree-strong and correlation degree-weak, correlation degree-strong, correlation degree-intermediate, and correlation degree-weak, or more quantization levels. This embodiment of this application is not limited thereto.

Specifically, the second device may quantize a difference between AoAs of every two signals. For example, when the difference is less than or equal to a first difference threshold, the second device quantizes the difference as 0, and it indicates the correlation degree-strong. When the difference is greater than the first difference threshold and less than a second difference threshold, the second device quantizes the difference as 1, and it indicates the correlation degree-intermediate. When the difference is greater than or equal to the second difference threshold, the second device quantizes the difference as 2, and it indicates the correlation degree-weak. The first difference threshold and the second difference threshold may be preset, or may be indicated by the first device. This embodiment of this application is not limited thereto.

The correlation degree included in the measurement information may include the quantized difference between the measurement results of the parameters of every two signals in the M signals, or may include the minimum value in the quantized difference between the measurement results of the parameters of every two signals in the M signals and the average value of the quantized difference between the measurement results of the parameters of every two signals in the M signals.

In this embodiment of this application, because the content of the measurement information includes the quantized difference, a data amount is relatively small, and a network resource can be saved.

Case 3: The measurement information is used to indicate the relationship between the N ports, and the relationship between the ports may include, for example, a grouping relationship between the N ports.

Specifically, the measurement information includes at least one of the following: group numbers of the N ports, a maximum group number difference in differences between each two group numbers in the group numbers of the N ports, a minimum group number difference in the differences between each two group numbers in the group numbers of the N ports, and an average value of the differences between each two group numbers in the group numbers of the N ports.

Therefore, in this embodiment of this application, the first device can relatively accurately determine the grouping relationship between the N ports based on the measurement information, so that the first device can perform appropriate communication management on the plurality of ports. For example, after obtaining the measurement information sent by the second device, the first device may perform, during MU-MIMO or robust transmission, appropriate communication management on the ports based on the measurement information fed back by the second device, and select an appropriate port to communicate with the second device. This improves the performance of communication between the first device and the second device.

For the case 3, in step 320, the second device determines the group numbers of the N ports based on receive information of the side of the second device.

The second device determines the measurement information based on the group numbers of the N ports. The measurement information includes at least one of the following: the group numbers of the N ports, the maximum group number difference in the difference between every two group numbers in the group numbers of the N ports, the minimum group number difference in the difference between every two group numbers in the group numbers of the N ports, and the average value of the difference between every two group numbers in the group numbers of the N ports.

For example, the first device (for example, the network device) may configure the reporting type of the second device (for example, the terminal device) by using DCI, and the first device sends two signals (for example, CSI-RSs or DMRSs) through two ports. The second device measures group numbers of the two signals. The second device determines the measurement information based on the group numbers of the N ports. For example, the measurement information includes at least one of the following: the group numbers of the N ports, the maximum group number difference in the difference between every two group numbers in the group numbers of the N ports, the minimum group number difference in the difference between every two group numbers in the group numbers of the N ports, and the average value of the difference between every two group numbers in the group numbers of the N ports.

The group numbers of the N ports may be determined by using the receive information of the side of the second device. It should be understood that the receive information of the second device may include information about a receive region of the second device. In this embodiment of this application, one port group corresponds to one receive region of the second device, and each port in the port group is used to send the signal. The receive region includes at least one receive port, where an energy value that is of the signal sent through each port and that is detected on the receive port is greater than or equal to a preset threshold. The receive region is determined by the second device based on a logical grouping rule.

To be specific, the second device may first divide the receive region of the second device based on the logical grouping rule. Then, the second device may group the plurality of ports of the first device into a plurality of port groups based on the receive region.

It should be understood that the logical grouping rule may include: grouping receive ports of the second device into a plurality of receive regions based on at least one piece of the following information: the receive ports of the second device, angles of arrival corresponding to the ports, weighted values of receive antennas of the second device, and numbers of the receive ports of the second device.

Figure 4:
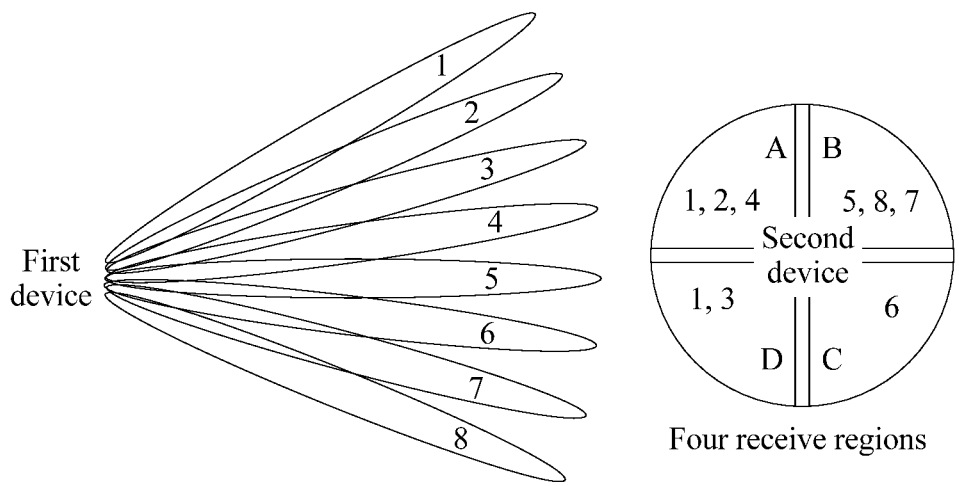
FIG. 4 is a schematic diagram of a receive region of a terminal device according to an embodiment of this application.

For example, as shown in FIG. 4, the receive region of the second device may be divided into four receive regions A, B, C, and D based on the logical grouping rule. The second device may group the plurality of ports of the first device based on the four receive regions.

The following describes, with reference to FIG. 4, a specific process in which the second device groups the ports. When the second device performs measurement on the receive region A, if the receive region A includes a receive port, where received signal energy values (Reference Signal Received Power, RSRP) that are detected on the port and that are of signals transmitted through ports 1, 2, and 4 are greater than or equal to a preset threshold (which is alternatively referred to as a threshold), the ports 1, 2, and 4 belong to a port group A corresponding to the receive region A. Grouping for port groups is performed in this manner. Obviously, a same port may belong to different port groups. For example, the port 1 belongs to the port group A and a port group D. A port group may include several ports, or may include no port.

It should be understood that in this embodiment of this application, when the second device rotates, the grouping for the port groups may be related or unrelated to the rotation of the second device. This is not limited in this embodiment of this application.

It should be noted that in this embodiment of this application, the logical grouping rule may be predefined in the network system, or may be indicated by the first device to the second device. This is not limited in this embodiment of this application.

When the logical grouping rule is indicated by the first device, the method may further include: sending, by the first device, rule indication information to the second device, where the rule indication information is used to indicate the logical grouping rule.

It should be further understood that groups of the ports of the first device may be determined by the first device, or may be preset in the system. This embodiment of this application is not limited thereto.

330. The second device sends the measurement information to the first device.

For example, the second device sends the measurement information on a system-predefined resource or a newly defined resource. Optionally, the second device may alternatively send the measurement information to the first device on a reserved resource. For example, the second device may send the measurement information by using existing signaling (for example, an ACK/NACK). Specifically, the measurement information may be carried in a reserved bit in an existing frame structure. This embodiment of this application is not limited thereto.

Therefore, in this embodiment of this application, the relationship between the plurality of ports is determined by using the characteristics of the ports on the side of the second device (the receive side), so that the first device can relatively accurately determine the relationship between the ports, and can perform appropriate communication management on the plurality of ports. This improves system performance.

Optionally, in another embodiment, after step 330, that is, after the first device obtains the measurement information, the first device may perform communication management on the N ports based on the measurement information.

For example, the first device may perform, during MU-MIMO or robust transmission, appropriate communication management on the ports based on the measurement information fed back by the second device, and select an appropriate port to communicate with the second device. This improves the performance of transmission between the first device and the second device.

The following describes, with reference to the foregoing case 1, case 2, and case 3 and by using an example in which the first device is the network device and the second device is the terminal device, a specific process in which the first device performs communication management on the N ports based on the measurement information in this embodiment of this application.

Figure 5:
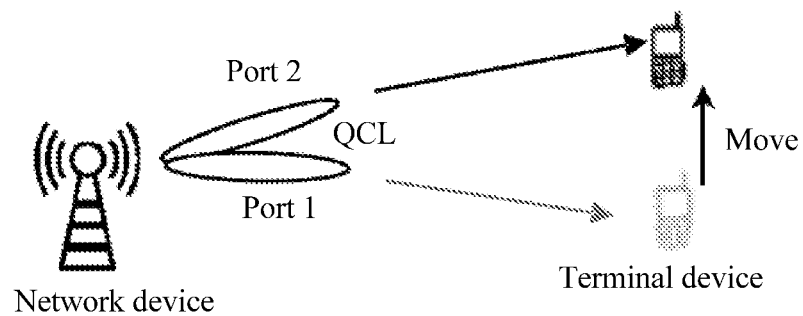
FIG. 5 is a schematic diagram of information transmission according to an embodiment of this application.

For the case 1, for example, as shown in FIG. 5, in particular transmission, the network device configures a port (a transmit beam) 1 for the terminal device for communication. In this case, if the network device wants to add one port for the terminal device to perform spatial multiplexing or a counter-mobility (mobility) diversity operation, the network device needs to select a port that has an AoA-QCL relationship with the port 1. Therefore, the network device selects a port 2 based on determining of the network device, and the network device verifies an assumption of the AoA-QCL relationship by using the method in the case 1. If the measurement information fed back by the terminal device is 1, that is, the ports 1 and 2 meet the AoA-QCL relationship, the network device may perform the spatial multiplexing or the counter-mobility diversity operation by using the beam. If the measurement information fed back by the terminal device is 0, that is, the ports 1 and 2 do not meet the AoA-QCL relationship, the network device needs to find another port and repeat the foregoing process.

Therefore, in this embodiment of this application, the first device can relatively accurately determine, based on the measurement information, whether the N ports meet the QCL relationship of the particular parameter, so that the first device can perform appropriate communication management on the plurality of ports. For example, the first device may perform, during MU-MIMO or robust transmission, appropriate communication management on the ports based on the measurement information fed back by the second device, and select an appropriate port to communicate with the second device. This improves the performance of communication between the first device and the second device.

Figure 6:
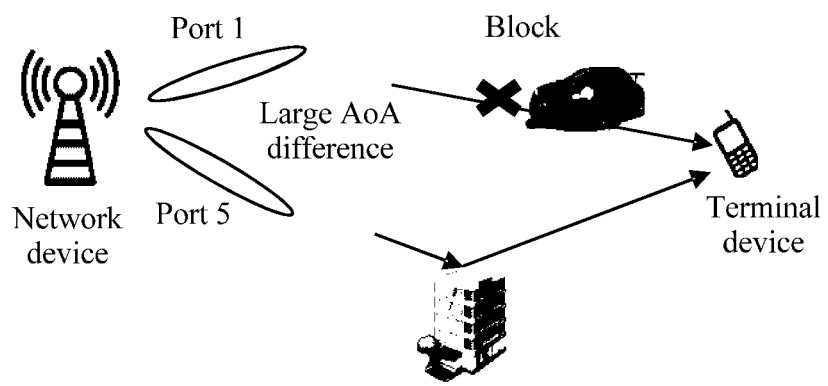
FIG. 6 is a schematic diagram of information transmission according to another embodiment of this application.

For the case 2, for example, as shown in FIG. 6, in particular transmission, the network device configures a port 1 for the terminal device for communication. In this case, if the network device wants to add one port for the terminal device to counter blockage (blockage), the added port needs to ensure that there is particular signal strength at the terminal device. In addition, because blockage usually occurs on a side of the terminal device, an AoA difference between the original port and the added port needs to be relatively large to prevent the two ports from being simultaneously blocked. In this case, the network device may select a port 5 by using the process in the case 2 and based on the measurement information fed back by the terminal device, where an AoA difference between the port 1 and the port 5 is relatively large.

Therefore, in this embodiment of this application, the first device can relatively accurately determine, based on the measurement information, whether the QCL relationship of the particular parameter is met, so that the first device can perform appropriate communication management on the plurality of ports. For example, the first device may perform, during MU-MIMO or robust transmission, appropriate communication management on the ports based on the measurement information fed back by the second device, and select an appropriate port to communicate with the second device.

This improves the performance of communication between the first device and the second device.

For the case 3, specifically, the first device can determine, based on the measurement information sent by the second device, that is, the grouping relationship between the N ports, at least one port set that is simultaneously used for downlink transmission to a plurality of second devices.

A quantity of ports included in each of the at least one port set is equal to a quantity of the plurality of second devices, and one port corresponds to one second device.

It should be understood that the at least one port set is at least one set having relatively good system performance in a plurality of port sets. In other words, signal quality of downlink data that is sent through a corresponding port in the at least one port set and that is received by the second device corresponding to the port set through a corresponding receive port is relatively good, and interference between downlink data sent through the ports is relatively low.

Therefore, in this embodiment of this application, the first device can relatively accurately determine the grouping relationship between the N ports based on the measurement information, so that the first device can perform appropriate communication management on the plurality of ports. For example, the first device may perform, during MU-MIMO or robust transmission, appropriate communication management on the ports based on the measurement information fed back by the second device, and select an appropriate port to communicate with the second device. This improves the performance of communication between the first device and the second device.

Figure 7:
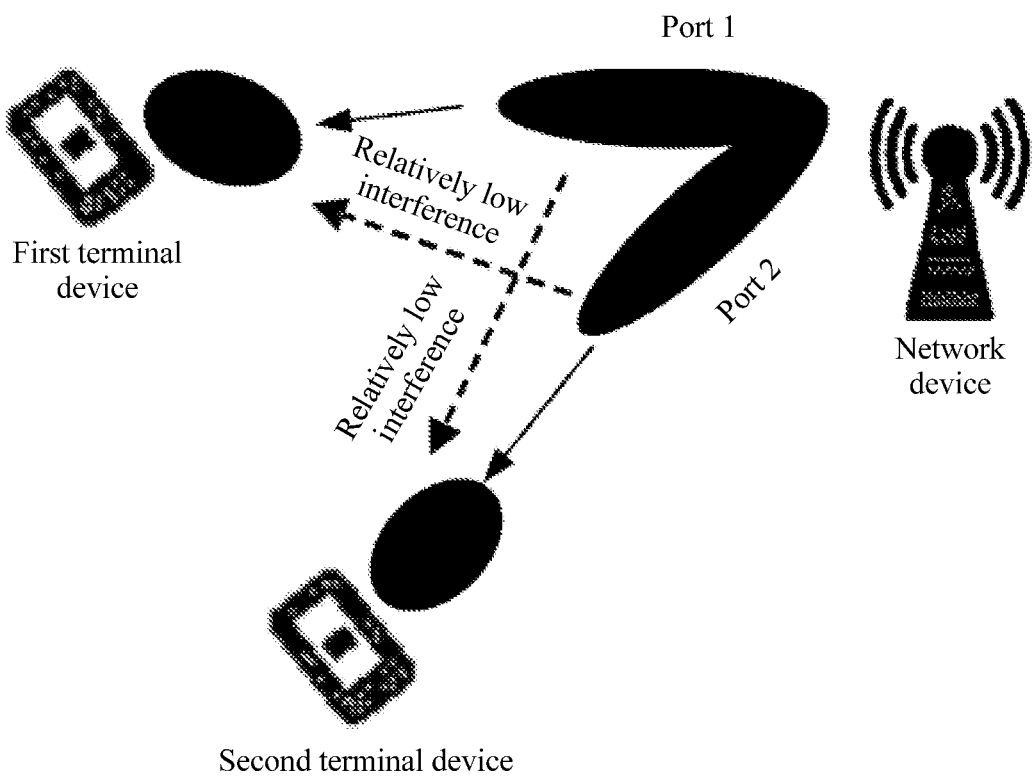
FIG. 7 is a schematic diagram of information transmission according to another embodiment of this application.

For example, as shown in FIG. 7, when performing MU-MIMO transmission, the network device may determine, based on measurement information fed back by a first terminal device and a second terminal device, a port 1 and a port 2 to respectively perform downlink data transmission to the first terminal device and the second terminal. Interference between downlink signals sent through the port 1 and the port 2 is relatively low.

Specifically, after the network device configures the port 1 in the N ports for the first terminal device, when the measurement information fed back by the first terminal device is the group numbers of the N ports, the first terminal device configures, for the second terminal device and from the N ports, a port 2 having a group number different from that of the port 1.

Alternatively, when the measurement information fed back by the first terminal device is the maximum group number difference in the difference between every two group numbers in the group numbers of the N ports, and the maximum group number difference is relatively small, after configuring the port 1 in the N ports for the first terminal device, to prevent configuring another port in the N ports for another terminal device, the network device configures a port 2 other than the N ports for the second terminal device.

Alternatively, when the measurement information fed back by the first terminal device is that the minimum group number difference in the difference between every two group numbers in the group numbers of the N ports is relatively large, after configuring the port 1 in the N ports for the first terminal device, the network device may determine an appropriate port 2 from the N ports and configure the port 2 for the second terminal device.

Alternatively, when the measurement information fed back by the first terminal device is the average value of the difference between every two group numbers in the group numbers of the N ports, and the average value is relatively small, it indicates that the group numbers of the N ports are relatively concentrated. Therefore, after configuring the port 1 in the N ports for the first terminal device, to prevent configuring another port in the N ports for another terminal device, the network device configures a port 2 other than the N ports for the second terminal device. Alternatively, when the average value is relatively large, it indicates that the group numbers of the N ports are relatively discrete. After configuring the port 1 in the N ports for the first terminal device, the network device may select a port 2 from the N ports or from ports other than the N ports, and configure the port 2 for the second terminal device.

Therefore, in this embodiment of this application, the first device can determine, based on the measurement information sent by the second device, a plurality of port sets that can be simultaneously used for transmission with the plurality of second devices and that has relatively low signal interference. This improves the performance of transmission between the first device and the second device.

The foregoing describes the information transmission method in the embodiments of this application with reference to FIG. 1 to FIG. 7. It should be noted that examples in FIG. 1 to FIG. 7 are merely used to help a person skilled in the art to understand the embodiments of this application, and the embodiments of this application are not limited to a specific value or specific scenario in the examples. Apparently, a person skilled in the art can make various equivalent modifications or changes based on the examples shown in FIG. 1 to FIG. 7, and such modifications or changes also fall within the scope of the embodiments of this application.

It should be understood that sequence numbers of the foregoing processes do not mean execution sequences. The execution sequences of the processes should be determined based on functions and internal logic of the processes, and should not be construed as any limitation on the implementation processes of the embodiments of this application.

Figure 8:
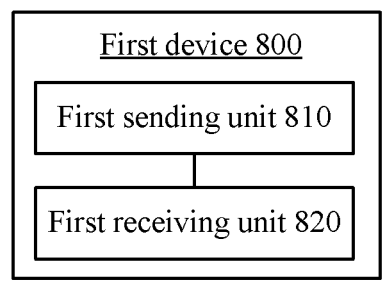
FIG. 8 is a schematic block diagram of a first device according to an embodiment of this application.
Figure 9:
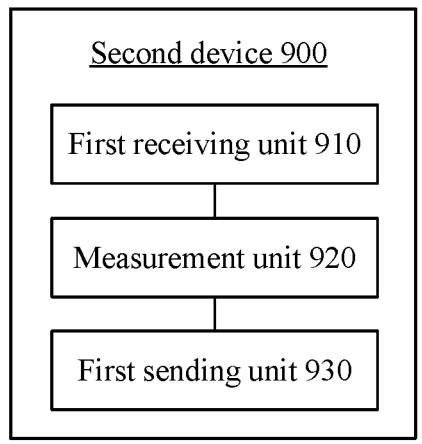
FIG. 9 is a schematic block diagram of a second device according to an embodiment of this application.
Figure 10:
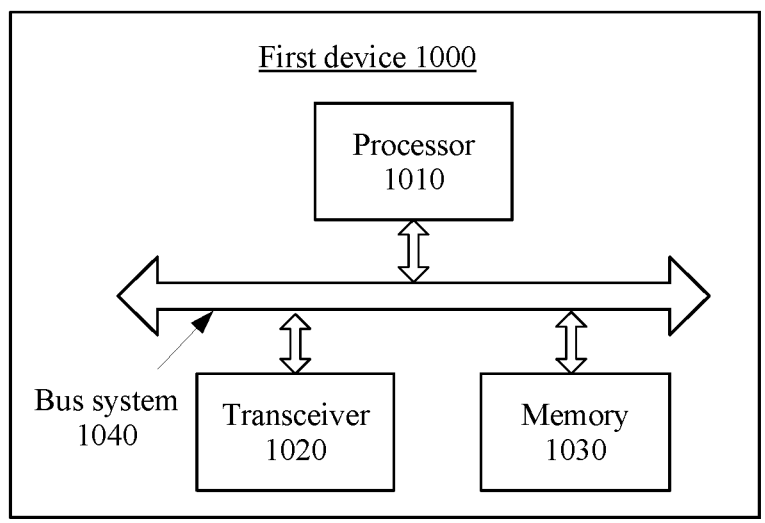
FIG. 10 is a schematic block diagram of a first device according to another embodiment of this application.
Figure 11:
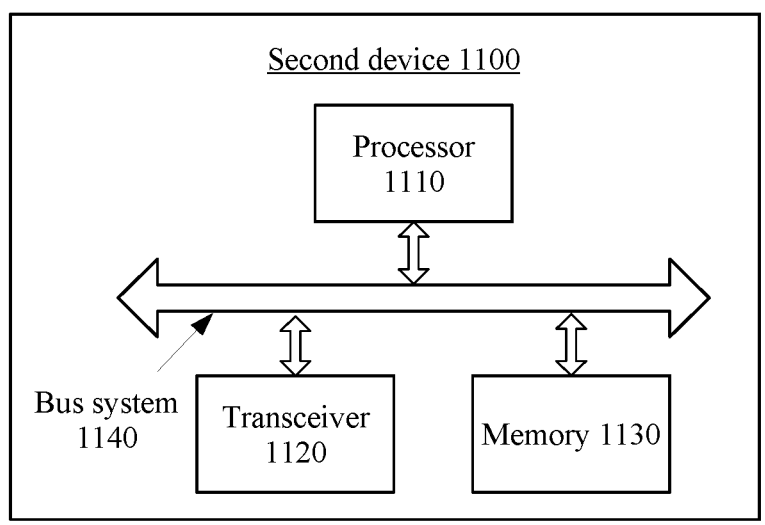
FIG. 11 is a schematic block diagram of a second device according to another embodiment of this application.

The following describes a first device in the embodiments of this application with reference to FIG. 8 and FIG. 10, and describes a second device in the embodiments of this application with reference to FIG. 9 and FIG. 11.

It should be understood that in the embodiments of this application, the first device may be a network device, and the second device may be a terminal device, or the first device and the second device both may be network devices, or the first device and the second device both may be terminal devices. The embodiments of this application are not limited thereto.

FIG. 8 is a schematic block diagram of a first device 800 according to an embodiment of this application. Specifically, as shown in FIG. 8, the first device 800 includes:

a first sending unit 810, configured to send M signals to a second device through N ports, where N and M are integers, and M≥N≥2; and a first receiving unit 820, configured to receive measurement information sent by the second device, where the measurement information is determined by the second device based on the M signals, and the measurement information is used to indicate a relationship between the N ports.

Therefore, in this embodiment of this application, the relationship between the ports is described by using characteristics of the ports on a side of the second device (a receive end side), so that the first device can relatively accurately determine the relationship between the ports, and the first device can perform appropriate communication management on the plurality of ports. This improves performance of transmission between the first device and the second device.

Optionally, in another embodiment, the first device further includes:

a second sending unit, configured to send instruction information to the second device before the first receiving unit 820 receives the measurement information sent by the second device, where the instruction information is used to indicate a reporting type, and the reporting type stipulates the measurement information.

Optionally, in another embodiment, the instruction information is further used to instruct the second device to determine whether the N ports corresponding to the M signals meet a QCL relationship of a particular parameter set. The particular parameter set includes at least one type of the following parameters:

a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, an AoD spread, and reciprocity of the second device.

The measurement information includes first relationship indication information or second relationship indication information. The first relationship indication information is used to indicate that the N ports meet the QCL relationship of the particular parameter set. The second relationship indication information is used to indicate that the N ports do not meet the QCL relationship of the particular parameter set.

Alternatively, in another embodiment, the instruction information is further used to instruct the second device to determine a correlation degree of measurement results of a parameter set of every two signals in the M signals. The correlation degree of the measurement results of the parameter set of every two signals is determined based on a difference between the measurement results of the parameter set of every two signals. The parameter set includes at least one type of the following parameters: a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, and an AoD spread.

The measurement information includes a correlation degree of the N ports that is measured by the second device. The correlation degree of the N ports is determined based on the difference between the measurement results of the parameter set of every two signals in the M signals. The correlation degree of the N ports indicates at least one of the following: quantized differences between measurement results of parameters of each two signals in the M signals, a maximum value in the quantized differences between the measurement results of the parameters of each two signals in the M signals, a minimum value in the quantized differences between the measurement results of the parameters of each two signals in the M signals, and an average value of the quantized differences between the measurement results of the parameters of each two signals in the M signals.

Alternatively, in another embodiment, the measurement information includes at least one piece of the following information:

group numbers of the N ports, a maximum group number difference in differences between each two group numbers in the group numbers of the N ports, a minimum group number difference in the differences between each two group numbers in the group numbers of the N ports, and an average value of the differences between each two group numbers in the group numbers of the N ports.

Optionally, in another embodiment, the first device further includes:

a second receiving unit, configured to: before the first sending unit 810 sends the M signals to the second device through the N ports, receive capability information sent by the second device, where the capability information indicates a quantity of signals that can be simultaneously received by the second device, a quantity of antenna panels of the second device, or a reciprocity degree of the second device, the reciprocity degree includes being totally reciprocal, partially reciprocal, or totally nonreciprocal with regard to a particular parameter, and the particular parameter includes angle information and/or gain information.

Optionally, in another embodiment, the M signals include at least one type of the following signals:

a channel information-reference signal CSI-RS, a demodulation reference signal DMRS, a beam reference signal BRS, and a phase noise reference signal PNRS.

The M signals are carried on at least one of the following channels:

a physical downlink control channel PDCCH, a physical downlink shared channel PDSCH, a physical uplink control channel PUCCH, and a physical downlink shared channel PUSCH.

Optionally, in another embodiment, the first receiving unit 820 is specifically configured to receive, on a reserved resource, the measurement information sent by the second device.

It should be understood that the first device 800 shown in FIG. 8 can implement various processes of the first device in the method embodiment in FIG. 3. Operations and/or functions of various modules in the first device 800 are separately used to implement the corresponding processes in the method embodiment in FIG. 3. For details, refer to the descriptions in the method embodiment. To avoid repetition, detailed descriptions are appropriately omitted herein.

FIG. 9 is a schematic block diagram of a second device 900 according to an embodiment of this application. Specifically, as shown in FIG. 9, the second device 900 includes:

a first receiving unit 910, configured to receive M signals that are sent by the first device through N ports, where N and M are integers, and M≥ N≥2;

a measurement unit 920, configured to measure the M signals to obtain measurement information, where the measurement information is used to indicate a relationship between the N ports; and a first sending unit 930, configured to send the measurement information to the first device.

Therefore, in this embodiment of this application, the second device sends the measurement information to the first device, so that the first device can relatively accurately determine the relationship between the ports by using characteristics on a side of the second device (a receive side), and the first device can perform appropriate communication management on a plurality of ports. This improves performance of transmission between the first device and the second device.

Optionally, in another embodiment, the second device further includes:

a second receiving unit, configured to: before the measurement unit measures the M signals to obtain the measurement information, receive instruction information sent by the first device, where the instruction information is used to indicate a reporting type, and the reporting type stipulates the measurement information.

Optionally, in another embodiment, the instruction information is further used to instruct the second device to determine whether the N ports corresponding to the M signals meet a QCL relationship of a particular parameter set.

The measurement unit is specifically configured to: determine, based on the reporting type, whether the N ports corresponding to the M signals meet the QCL relationship of the particular parameter set, where the particular parameter set includes at least one type of the following parameters: a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, an AoD spread, and reciprocity of the second device; and determine the measurement information based on a result of the determining whether the N ports meet the QCL relationship of the particular parameter set, where the measurement information includes first relationship indication information or second relationship indication information, the first relationship indication information is used to indicate that the N ports meet the QCL relationship of the particular parameter set, and the second relationship indication information is used to indicate that the N ports do not meet the QCL relationship of the particular parameter set.

Alternatively, in another embodiment, the instruction information is further used to instruct the second device to determine a correlation degree of measurement results of a parameter set of every two signals in the M signals. The correlation degree of the measurement results of the parameter set of every two signals is determined based on a difference between the measurement results of the parameter set of every two signals.

The measurement unit is specifically configured to: determine a difference between measurement results of parameters of every two signals in the M signals based on the reporting type, where the parameter includes: a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, and an AoD spread; and determine the measurement information based on a difference between the parameters of every two signals in the M signals, where the measurement information includes a correlation degree of the N ports that is measured by the second device, and the correlation degree of the N ports indicates at least one of the following: a quantized difference between the measurement results of the parameters of every two signals in the M signals, a maximum value in the quantized differences between the measurement results of the parameters of each two signals in the M signals, a minimum value in the quantized differences between the measurement results of the parameters of each two signals in the M signals, and an average value of the quantized differences between the measurement results of the parameters of each two signals in the M signals.

Alternatively, in another embodiment, the measurement unit is specifically configured to: determine group numbers of the N ports based on receive information of the side of the second device; and determine the measurement information based on the group numbers of the N ports, where the measurement information includes at least one of the following: the group numbers of the N ports, a maximum group number difference in differences between each two group numbers in the group numbers of the N ports, a minimum group number difference in the differences between each two group numbers in the group numbers of the N ports, and an average value of the differences between each two group numbers in the group numbers of the N ports.

Optionally, in another embodiment, the second device further includes:

a second sending unit, configured to: send capability information to the first device before the first receiving unit receives the M signals that are sent by the first device through the N ports, where the capability information indicates a quantity of receive ports that can be simultaneously used by the second device to perform reception, a quantity of receive beams that can be simultaneously used by the second device to perform reception, a quantity of antenna panels of the second device, a correspondence between a transmit parameter and a receive parameter of the second device, or a reciprocity degree of the second device, the reciprocity degree includes being totally reciprocal, partially reciprocal, or totally nonreciprocal with regard to a particular parameter, and the particular parameter includes angle information and/or gain information.

Optionally, in another embodiment, the M signals include at least one type of the following signals:

a channel information-reference signal CSI-RS, a demodulation reference signal DMRS, a beam reference signal BRS, and a phase noise reference signal PNRS.

The M signals are carried on at least one of the following channels:

a physical downlink control channel PDCCH, a physical downlink shared channel PDSCH, a physical uplink control channel PUCCH, and a physical downlink shared channel PUSCH.

Optionally, in another embodiment, the first sending unit is specifically configured to send the measurement information to the first device on a reserved resource.

It should be understood that the second device 900 shown in FIG. 9 can implement various processes of the second device in the method embodiment in FIG. 3. Operations and/or functions of various modules in the second device 900 are separately used to implement the corresponding processes in the method embodiment in FIG. 3. For details, refer to the descriptions in the method embodiment. To avoid repetition, detailed descriptions are appropriately omitted herein.

FIG. 10 is a schematic block diagram of a first device 1000 according to an embodiment of this application. Specifically, as shown in FIG. 10, the first device 1000 includes a processor 1010 and a transceiver 1020. The processor 1010 is connected to the transceiver 1020. Optionally, the first device 1000 further includes a memory 1030, and the memory 1030 is connected to the processor 1010. Further optionally, the first device 1000 may further include a bus system 1040. The processor 1010, the memory 1030, and the transceiver 1020 may be connected by using the bus system 1040. The memory 1030 may be configured to store an instruction. The processor 1010 is configured to execute the instruction stored in the memory 1030, to control the transceiver 1020 to receive and transmit information or signals.

Specifically, the processor 1010 controls the transceiver 1020 to send M signals to a second device through N ports, where N and M are integers, and M≥ N≥2; and receive measurement information sent by the second device, where the measurement information is determined by the second device based on the M signals, and the measurement information is used to indicate a relationship between the N ports.

Therefore, in this embodiment of this application, the relationship between the ports is described by using characteristics of the ports on a side of the second device (a receive end side), so that the first device can relatively accurately determine the relationship between the ports, and the first device can perform appropriate communication management on the plurality of ports. This improves performance of transmission between the first device and the second device.

It should be understood that in this embodiment of this application, the processor 1010 may be a central processing unit (Central Processing Unit, "CPU" for short), or the processor 1010 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 1030 may include a read-only memory and a random access memory, and provide an instruction and data to the processor 1010. A part of the memory 1030 may further include a non-volatile random access memory. For example, the memory 1030 may further store information about a device type.

In addition to a data bus, the bus system 1040 may further include a power bus, a control bus, a status signal bus, and the like. However, for clear description, various types of buses in the figure are marked as the bus system 1040.

In an implementation process, steps in the foregoing method can be implemented by using a hardware integrated logical circuit in the processor 1010, or by using instructions in a form of software. The steps of the method disclosed with reference to the embodiments of this application may be directly performed by a hardware processor, or may be performed by using a combination of hardware and software modules in the processor. The software module may be located in a mature storage medium in the art, for example, a random access memory, a flash memory, a read-only memory, a programmable read-only memory, an electrically erasable programmable memory, or a register. The storage medium is located in the memory 1030, and the processor 1010 reads information in the memory 1030 and completes the steps in the foregoing method in combination with hardware of the processor. To avoid repetition, details are not described herein again.

Optionally, in another embodiment, the transceiver 1020 is further configured to: before receiving the measurement information sent by the second device, send instruction information to the second device, where the instruction information is used to indicate a reporting type, and the reporting type stipulates the measurement information.

Optionally, in another embodiment, the instruction information is further used to instruct the second device to determine whether the N ports corresponding to the M signals meet a QCL relationship of a particular parameter set. The particular parameter set includes at least one type of the following parameters:

a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, an AoD spread, and reciprocity of the second device.

The measurement information includes first relationship indication information or second relationship indication information. The first relationship indication information is used to indicate that the N ports meet the QCL relationship of the particular parameter set. The second relationship indication information is used to indicate that the N ports do not meet the QCL relationship of the particular parameter set.

Alternatively, in another embodiment, the instruction information is further used to instruct the second device to determine a correlation degree of measurement results of a parameter set of every two signals in the M signal. The correlation degree of the measurement results of the parameter set of every two signals is determined based on a difference between the measurement results of the parameter set of every two signals. The parameter set includes at least one type of the following parameters: a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, and an AoD spread.

The measurement information includes a correlation degree of the N ports that is measured by the second device. The correlation degree of the N ports is determined based on the difference between the measurement results of the parameter set of every two signals in the M signals. The correlation degree of the N ports indicates at least one of the following: quantized differences between measurement results of parameters of each two signals in the M signals, a maximum value in the quantized differences between the measurement results of the parameters of each two signals in the M signals, a minimum value in the quantized differences between the measurement results of the parameters of each two signals in the M signals, and an average value of the quantized differences between the measurement results of the parameters of each two signals in the M signals.

Alternatively, in another embodiment, the measurement information includes at least one piece of the following information:

group numbers of the N ports, a maximum group number difference in differences between each two group numbers in the group numbers of the N ports, a minimum group number difference in the differences between each two group numbers in the group numbers of the N ports, and an average value of the differences between each two group numbers in the group numbers of the N ports.

Optionally, in another embodiment, the transceiver 1020 is further configured to: before the first sending unit 810 sends the M signals to the second device through the N ports, receive capability information sent by the second device. The capability information indicates a quantity of receive ports that can be simultaneously used by the second device to perform reception, a quantity of receive beams that can be simultaneously used by the second device to perform reception, a quantity of antenna panels of the second device, a correspondence between a transmit parameter and a receive parameter of the second device, or a reciprocity degree of the second device. The reciprocity degree includes being totally reciprocal, partially reciprocal, or totally nonreciprocal with regard to a particular parameter. The particular parameter includes angle information and/or gain information.

Optionally, in another embodiment, the M signals include at least one type of the following signals:

a channel information-reference signal CSI-RS, a demodulation reference signal DMRS, a beam reference signal BRS, and a phase noise reference signal PNRS.

The M signals are carried on at least one of the following channels:

a physical downlink control channel PDCCH, a physical downlink shared channel PDSCH, a physical uplink control channel PUCCH, and a physical downlink shared channel PUSCH.

Optionally, in another embodiment, the first receiving unit 820 is specifically configured to receive, on a reserved resource, the measurement information sent by the second device.

It should be understood that the first device 1000 shown in FIG. 10 can implement various processes of the first device in the method embodiment in FIG. 3. Operations and/or functions of various modules in the first device 1000 are separately used to implement the corresponding processes in the method embodiment in FIG. 3. For details, refer to the descriptions in the method embodiment. To avoid repetition, detailed descriptions are appropriately omitted herein.

FIG. 11 is a schematic block diagram of a second device 1100 according to an embodiment of this application. Specifically, as shown in FIG. 11, the second device 1100 includes a processor 1110 and a transceiver 1120. The processor 1110 is connected to the transceiver 1120. Optionally, the second device 1100 further includes a memory 1130, and the memory 1130 is connected to the processor 1110. Further optionally, the second device 1100 may further include a bus system 1140. The processor 1110, the memory 1130, and the transceiver 1120 may be connected by using the bus system 1140. The memory 1130 may be configured to store an instruction. The processor 1110 is configured to execute the instruction stored in the memory 1130, to control the transceiver 1120 to receive and transmit information or signals.

Specifically, the controller 1110 controls the transceiver 1120 to receive M signals that are sent by the first device through N ports, where N and M are integers, and M≥N≥2. The controller 1110 is configured to measure the M signals to obtain measurement information, where the measurement information is used to indicate a relationship between the N ports. The transceiver 1120 is further configured to send the measurement information to the first device.

Therefore, in this embodiment of this application, the second device sends the measurement information to the first device, so that the first device can relatively accurately determine the relationship between the ports by using characteristics on a side of the second device (a receive side), and the first device can perform appropriate communication management on the plurality of ports. This improves performance of transmission between the first device and the second device.

It should be understood that in this embodiment of this application, the processor 1110 may be a central processing unit (Central Processing Unit, "CPU" for short), or the processor 1110 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 1130 may include a read-only memory and a random access memory, and provide an instruction and data to the processor 1110. A part of the memory 1130 may further include a non-volatile random access memory. For example, the memory 1130 may further store information about a device type.

In addition to a data bus, the bus system 1140 may further include a power bus, a control bus, a status signal bus, and the like. However, for clear description, various types of buses in the figure are marked as the bus system 1140.

In an implementation process, steps in the foregoing method can be implemented by using a hardware integrated logical circuit in the processor 1110, or by using instructions in a form of software. The steps of the method disclosed with reference to the embodiments of this application may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 1130, and the processor 1110 reads information in the memory 1130 and completes the steps in the foregoing method in combination with hardware of the processor. To avoid repetition, details are not described herein again.

Optionally, in another embodiment, the transceiver 1120 is configured to: before the measurement unit measures the M signals to obtain the measurement information, receive instruction information sent by the first device, where the instruction information is used to indicate a reporting type, and the reporting type stipulates the measurement information.

Optionally, in another embodiment, the instruction information is further used to instruct the second device to determine whether the N ports corresponding to the M signals meet a QCL relationship of a particular parameter set.

The processor 1110 is specifically configured to: determine, based on the reporting type, whether the N ports corresponding to the M signals meet the QCL relationship of the particular parameter set, where the particular parameter set includes at least one type of the following parameters: a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, an AoD spread, and reciprocity of the second device; and determine the measurement information based on a result of the determining whether the N ports meet the QCL relationship of the particular parameter set, where the measurement information includes first relationship indication information or second relationship indication information, the first relationship indication information is used to indicate that the N ports meet the QCL relationship of the particular parameter set, and the second relationship indication information is used to indicate that the N ports do not meet the QCL relationship of the particular parameter set.

Alternatively, in another embodiment, the instruction information is further used to instruct the second device to determine a correlation degree of measurement results of a parameter set of every two signals in the M signals. The correlation degree of the measurement results of the parameter set of every two signals is determined based on a difference between the measurement results of the parameter set of every two signals.

The processor 1110 is specifically configured to: determine a difference between measurement results of parameters of every two signals in the M signals based on the reporting type, where the parameter includes: a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, and an AoD spread; and determine the measurement information based on a difference between the parameters of every two signals in the M signals, where the measurement information includes a correlation degree of the N ports that is measured by the second device, and the correlation degree of the N ports indicates at least one of the following: a quantized difference between the measurement results of the parameters of every two signals in the M signals, a maximum value in the quantized differences between the measurement results of the parameters of each two signals in the M signals, a minimum value in the quantized differences between the measurement results of the parameters of each two signals in the M signals, and an average value of the quantized differences between the measurement results of the parameters of each two signals in the M signals.

Alternatively, in another embodiment, the processor 1110 is specifically configured to: determine group numbers of the N ports based on receive information of the side of the second device; and determine the measurement information based on the group numbers of the N ports, where the measurement information includes at least one of the following: the group numbers of the N ports, a maximum group number difference in differences between each two group numbers in the group numbers of the N ports, a minimum group number difference in the differences between each two group numbers in the group numbers of the N ports, and an average value of the differences between each two group numbers in the group numbers of the N ports.

Optionally, in another embodiment, the transceiver 1120 is further configured to send capability information to the first device before the first receiving unit receives the M signals that are sent by the first device through the N ports. The capability information indicates a quantity of receive ports that can be simultaneously used by the second device to perform reception, a quantity of receive beams that can be simultaneously used by the second device to perform reception, a quantity of antenna panels of the second device, a correspondence between a transmit parameter and a receive parameter of the second device, or a reciprocity degree of the second device. The reciprocity degree includes being totally reciprocal, partially reciprocal, or totally nonreciprocal with regard to a particular parameter. The particular parameter includes angle information and/or gain information.

Optionally, in another embodiment, the M signals include at least one type of the following signals:

a channel information-reference signal CSI-RS, a demodulation reference signal DMRS, a beam reference signal BRS, and a phase noise reference signal PNRS.

The M signals are carried on at least one of the following channels:

a physical downlink control channel PDCCH, a physical downlink shared channel PDSCH, a physical uplink control channel PUCCH, and a physical downlink shared channel PUSCH.

Optionally, in another embodiment, the transceiver 1120 is specifically configured to send the measurement information to the first device on a reserved resource.

It should be understood that the second device 1100 shown in FIG. 11 can implement various processes of the second device in the method embodiment in FIG. 3. Operations and/or functions of various modules in the second device 1100 are separately used to implement the corresponding processes in the method embodiment in FIG. 3. For details, refer to the descriptions in the method embodiment. To avoid repetition, detailed descriptions are appropriately omitted herein.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should be further understood that determining B based on A does not mean that B is determined based on A only, but B may be alternatively determined based on A and/or other information.

It should be understood that in the embodiments of this application, because the second device reports the quantity of receive ports that can be simultaneously used by the second device to perform reception, the quantity of receive beams that can be simultaneously used by the second device to perform reception, or the quantity of antenna panels of the second device, the solution in this application may be applied to a second device having one or more receive ports, one or more receive beams, or one or more antenna panels.

A person of ordinary skill in the art may be aware that units and algorithm steps in the examples described in the embodiments disclosed with reference to this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

It may be clearly understood by a person skilled in the art that for the purpose of convenient and brief description, for a specific working process of the foregoing system, apparatus, and unit, reference may be made to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between the apparatuses or units implemented through some interfaces, or may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another optical disc storage, a disk storage medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. For example, a disk (Disk) and disc (disc) used in this application include a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

The invention claimed is:

1. An information transmission method, comprising:
receiving, by a second device, M signals that are from the first device through N ports, wherein N and M are integers, and M≥N≥2;
receiving, by the second device, instruction information from the first device, wherein the instruction information is used to instruct the second device to send the measurement information to the first device;
measuring, by the second device, the M signals to obtain measurement information, wherein the measurement information is used to indicate a relationship between the N ports, wherein the measuring, by the second device, the M signals to obtain measurement information comprises:
determining, by the second device, group numbers of the N ports based on receive information of a side of the second device; and
determining, by the second device, the measurement information based on the group numbers of the N ports, wherein the measurement information comprises at least one of the following: the group numbers of the N ports, a maximum group number difference in differences between each two group numbers in the group numbers of the N ports, a minimum group number difference in the differences between each two group numbers in the group numbers of the N ports, and an average value of the differences between each two group numbers in the group numbers of the N ports; and
sending, by the second device, the measurement information to the first device.

2. The method of claim 1, wherein the measurement information is carried in ACK/NACK signaling.

3. A first device, comprising:
a transmitter, configured to send M signals to a second device through N ports, wherein N and M are integers, and M≥N≥2; and
a receiver, configured to receive measurement information from the second device, wherein the measurement information is determined by the second device based on the M signals, and the measurement information is used to indicate a relationship between the N ports,
wherein the transmitter is further configured to send instruction information to the second device before the receiver receives the measurement information from the second device, wherein the instruction information is used to indicate a reporting type, and the reporting type stipulates the measurement information;
wherein the instruction information is further used to instruct the second device to determine a correlation degree of measurement results of a parameter set of every two signals in the M signals, the correlation degree of the measurement results of the parameter set of every two signals is determined based on a difference between the measurement results of the parameter set of every two signals, and the parameter set comprises at least one type of the following parameters: a received delay spread, a Doppler spread, a Doppler frequency shift, an average delay, a gain, an average gain, a gain spread, an angle of arrival AoA, an average AoA, an AoA spread, uplink angles of departure AoDs of the second device that are corresponding to the signals, an average AoD, and an AoD spread; and
wherein the measurement information comprises a correlation degree of the N ports that is measured by the second device, the correlation degree of the N ports is determined based on the difference between the measurement results of the parameter set of every two signals in the M signals, and the correlation degree of the N ports indicates at least one of the following: quantized differences between measurement results of parameters of each two signals in the M signals, a maximum value in the quantized differences between the measurement results of the parameters of each two signals in the M signals, a minimum value in the quantized differences between the measurement results of the parameters of each two signals in the M signals, and an average value of the quantized differences between the measurement results of the parameters of each two signals in the M signals.

4. The first device of claim 3, wherein the measurement information is carried in ACK/NACK signaling.

5. A second device, comprising:
a receiver, configured to receive M signals from a first device through N ports, wherein N and M are integers, and M≥N≥2;
a processor, configured to measure the M signals to obtain measurement information, wherein the measurement information is used to indicate a relationship between the N ports; and
a transmitter, configured to send the measurement information to the first device;
wherein before the processor measures the M signals to obtain the measurement information, the receiver receives instruction information from the first device, wherein the instruction information is used to indicate a reporting type, and the reporting type stipulates the measurement information;
wherein the processor is further configured to:
determine group numbers of the N ports based on receive information of a side of the second device; and
determine the measurement information based on the group numbers of the N ports, wherein the measurement information comprises at least one of the following: the group numbers of the N ports, a maximum group number difference in differences between each two group numbers in the group numbers of the N ports, a minimum group number difference in the differences between each two group numbers in the group numbers of the N ports, and an average value of the differences between each two group numbers in the group numbers of the N ports.

6. The second device of claim 5, wherein the measurement information is carried in ACK/NACK signaling.

* * * * *

UNITED STATES PATENT AND TRADEMARK OFFICE
CERTIFICATE OF CORRECTION

PATENT NO. : 11,089,599 B2  
APPLICATION NO. : 16/400711  
DATED : August 10, 2021  
INVENTOR(S) : Ren et al.

Page 1 of 1

It is certified that error appears in the above-identified patent and that said Letters Patent is hereby corrected as shown below:

On the Title Page

Applicant (71): "HUAWEI TECHNOLOGIES CO., LTD., Guangdong (CN)" should read -- HUAWEI TECHNOLOGIES CO., LTD., Shenzhen (CN) --.

Signed and Sealed this  
Twelfth Day of July, 2022

Katherine Kelly Vidal  
*Director of the United States Patent and Trademark Office*